(12) United States Patent
Feng

(10) Patent No.: US 11,937,563 B2
(45) Date of Patent: Mar. 26, 2024

(54) GREENHOUSE

(71) Applicant: Yi Feng, Taizhou (CN)

(72) Inventor: Yi Feng, Taizhou (CN)

( * ) Notice: Subject to any disclaimer, the term of this patent is extended or adjusted under 35 U.S.C. 154(b) by 403 days.

(21) Appl. No.: 17/137,480

(22) Filed: Dec. 30, 2020

(65) Prior Publication Data

US 2022/0132752 A1 May 5, 2022

(30) Foreign Application Priority Data

Nov. 2, 2020 (CN) .......................... 202011203888.0

(51) Int. Cl.
| | |
|---|---|
| *F16L 15/00* | (2006.01) |
| *A01G 9/14* | (2006.01) |
| *A01G 9/24* | (2006.01) |
| *B05B 1/26* | (2006.01) |
| *B05B 1/30* | (2006.01) |
| *B05B 15/658* | (2018.01) |
| *F16L 19/065* | (2006.01) |

(52) U.S. Cl.
CPC ............... *A01G 9/247* (2013.01); *A01G 9/14* (2013.01); *B05B 1/265* (2013.01); *B05B 1/304* (2013.01); *B05B 15/658* (2018.02); *F16L 15/008* (2013.01); *F16L 19/065* (2013.01)

(58) Field of Classification Search
CPC ....... F16L 19/06; F16L 19/065; F16L 19/061; F16L 19/08; F16L 19/02; F16L 19/0206; F16L 19/0218; F16L 19/086; F16L 41/12; F16L 47/04; A01G 9/247; B05B 1/265; B05B 1/304
USPC .......................................................... 285/64
See application file for complete search history.

(56) References Cited

U.S. PATENT DOCUMENTS 2,048,125 A * 7/1936 Irving
2,644,700 A * 7/1953 Woodling ............... F16L 19/08
(Continued)

FOREIGN PATENT DOCUMENTS

| CN | 2328847 Y | 7/1999 |
| CN | 201152423 Y | 11/2008 |

(Continued)

OTHER PUBLICATIONS

Vieregge—Machine Translation—English (Year: 1992).*

(Continued)

*Primary Examiner* — William S. Choi
(74) *Attorney, Agent, or Firm* — Minder Law Group; Willy H. Wong

(57) ABSTRACT

A greenhouse comprises a support frame and a spray pipe including pipes and pipe joints, the pipe joint comprises a connecting pipe and two rotary sleeves, the two adjacent pipes are respectively inserted into the connecting pipe, ends of a first pipe are respectively sleeved with a sealing sleeve and a locking sleeve, and each of the ends of the first pipe is further sleeved with a washer. When the rotary sleeve is thread-tightened, the connecting pipe and the locking sleeve are capable of respectively abutting and pressing against two sides of the washer, under abutting and pushing of the rotary sleeve and limiting of the washer, the locking sleeve is capable of grasping the first pipe and forming an axial positioning with the rotary sleeve. An inner edge of an end surface of the connecting pipe has a sealing tapered surface capable of acting on the sealing sleeve.

8 Claims, 8 Drawing Sheets

(56) References Cited

U.S. PATENT DOCUMENTS 3,999,785 A * 12/1976 Blakeley ................. F16L 41/12
4,624,414 A * 11/1986 Ferrazza
5,593,186 A * 1/1997 Harris ..................... F16L 47/04

FOREIGN PATENT DOCUMENTS

| CN | 202580374 U | * | 12/2012 | ............. F16L 21/08 |
| CN | 103727335 A |   | 4/2014  |  |
| CN | 203656394 U |   | 6/2014  |  |
| CN | 203948835 U |   | 11/2014 |  |
| CN | 105114752 A |   | 12/2015 |  |
| CN | 106090475 A | * | 11/2016 | ............. F16L 19/06 |
| CN | 210424128 U |   | 4/2020  |  |
| CN | 111108971 A | * | 5/2020  | ............. F16L 19/06 |
| CN | 210510696 U |   | 5/2020  |  |
| EP | 322500 A    | * | 7/1989  | ............. F16L 41/12 |
| EP | 1605195 A1  | * | 12/2005 | ............ F16L 19/061 |
| KR | 2010002153 U | * | 3/2010 |  |
| KR | 1712315 B1  | * | 3/2017  | ............ F16L 19/061 |
| RU | 201437 U1   | * | 12/2020 | ............. F16L 19/06 |
| WO | WO-2004029494 A1 | * | 4/2004 | ............ F16L 19/086 |

OTHER PUBLICATIONS

Ge—Machine Translation—English (Year: 2004).*
Chevrier—Machine Translation—English (Year: 2007).*
Chang—Machine Translation—English (Year: 2010).*
Ding—Machine Translation—English (Year: 2012).*
Cai—Machine Translation—English (Year: 2016).*
Dong Un—Machine Translation—English (Year: 2017).*
Chen—Machine Translation—English (Year: 2020).*
Berezovsky—Machine Translation—English (Year: 2020).*

* cited by examiner

GREENHOUSE

RELATED APPLICATIONS

This application claims priority to Chinese Patent Application No. CN202011203888.0 filed Nov. 2, 2020.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The invention belongs to the technical field of agricultural facilities and relates to a greenhouse.

Related Art

Greenhouse, also known as hothouse, is an agricultural facility that can cultivate plants through transmitting light and preserving heat. In the seasons that are not suitable for plant growth, greenhouse can be provided as an environment for growth period and increasing production of plants. Greenhouse is mostly used for cultivation or seedling nursery of thermophilous plants such as vegetables, flowers, and trees in low temperature seasons. The existing greenhouses are also equipped with an irrigation system, that is, spray pipes and sprinklers are installed in the greenhouses. In order to be suitable for different greenhouse sizes, the spray pipes are usually formed by connecting multiple pipes by pipe joints. Therefore, the adjacent pipes need to be connected and sealed.

For example, one prior art (CN201921427770.9) discloses union pipe fittings of a water supply pipeline. Ends of a union pipe are respectively screwed and sleeved with a connecting sleeve, an end of the pipeline is inserted into the union pipe, a union pipe port is disposed with a groove, a groove wall of the groove is a tapered surface, inside the groove is disposed with a sealing ring and a locking ring, and an outer peripheral surface of the locking ring is also a tapered surface. When the connecting sleeve is thread-tightened, the locking ring can be pressed tightly, the locking ring moves in an axial direction and presses the sealing ring tightly to achieve sealing, while the locking ring is capable of radially contracting and grasping the pipeline tightly under an action of the tapered surface when the locking ring moves in an axial direction to realize connection. Since the compressed seal of the sealing ring and the radial contraction and clamping of the locking ring are both achieved by the connecting sleeve pressing against the locking ring to move, it is difficult for the locking ring to reach a suitable position to meet both the requirement of watertightness and the requirement of grasping the pipeline tightly. If connection stability is a prioritized requirement to be met, it is possible that the sealing ring is not pressed tightly enough resulting in poor watertightness, or the sealing ring is pressed excessively resulting in damage and deformation of the sealing ring, which makes it difficult to ensure watertightness over a long period of time. If watertightness is a prioritized requirement to be met, a locking force of the locking ring may be insufficient, and in addition to the locking ring directly abutting and pressing against the sealing ring, the locking ring also needs to contract radially during a locking process, which will affect the sealing ring.

In view of the above-mentioned drawbacks caused by the watertightness and connection stability being determined by a position of the locking ring, in order to tackle the drawbacks, one prior art (CN201420301645.4) discloses a water outlet device with adjustable water pipe length, which separates a plastic washer from a sealing ring, when a lock nut is thread-tightened, the plastic washer grasps an inner water pipe tightly through a tapered surface, and the sealing ring is independently disposed in an annular groove, which has nothing to do with the lock nut and the plastic washer; that is, watertightness is not related to connection stability. However, during assembling, a pipe joint needs to be inserted into an outer water pipe, if an expansive force of the sealing ring is too large, it will be difficult to insert the pipe joint; if an expansive force of the sealing ring is too small, the watertightness is limited.

SUMMARY OF THE INVENTION

In view of the above-mentioned problems in the existing technology, one object of one embodiment of the invention is to disclose a greenhouse to solve the problem of the existing greenhouses being incapable of simultaneously addressing the watertightness and connection stability of a spray pipe.

One object of one embodiment of the invention can be achieved by the following technical solutions: a greenhouse comprises a support frame and a spray pipe fixed on the support frame, the spray pipe comprises a plurality of pipes and pipe joints are disposed between ends of two adjacent pipes, and the pipe joint comprises a connecting pipe and two rotary sleeves respectively screwed to and sleeved on two ends of the connecting pipe. The two adjacent pipes are respectively inserted into the two ends of the connecting pipe, ends of a first pipe are respectively sleeved with a sealing sleeve and a locking sleeve, and the sealing sleeve and the locking sleeve are located in a corresponding rotary sleeve of the two rotary sleeves. Each of the ends of the first pipe is further sleeved with a washer made of rigid material, the washer is located between the connecting pipe and the locking sleeve, an inner edge of an end surface of the connecting pipe has a sealing tapered surface, the sealing sleeve is located between the connecting pipe and the washer. When the rotary sleeve is thread-tightened, the connecting pipe and the locking sleeve are capable of respectively abutting and pressing against two sides of the washer. When the connecting pipe is abutted and pressed against the washer, the sealing tapered surface is capable of acting on the sealing sleeve, so that the sealing sleeve is compression-tightened between the connecting pipe, the washer, and the first pipe. Under the abutting and pushing of the rotary sleeve and under the limiting of the washer, the locking sleeve is capable of grasping the first pipe tightly and forming an axial positioning with the rotary sleeve.

In this application, the watertightness and connection stability between one embodiment of the pipe joint and the first pipe are gradually enhanced by thread-tightening the rotary sleeve during an assembly process, but the sealing sleeve and the locking sleeve are separated by the washer, so that the watertightness and connection stability are independent of each other and are not related to each other. Specifically, the sealing sleeve is not pressed during an assembly initially, so it is easier for the first pipe to be inserted and to pass through the sealing sleeve, and a length of the first pipe being inserted can be adjusted as needed to adjust a length of the entire spray pipe. Then the rotary sleeve is thread-tightened, and, during rotation, the rotary sleeve first drives the locking sleeve to move axially and abut against the washer, and then the rotary sleeve drives the locking sleeve and the washer to move toward the sealing sleeve, so that the washer gradually presses the sealing sleeve and gradually causing the sealing sleeve to press the sealing tapered surface of the connecting pipe until an end surface of the washer presses against the end surface of the connecting pipe. At this time, the sealing sleeve presses the washer tightly axially and grasps the first pipe radially under an action of the sealing tapered surface, and the sealing sleeve is compression-tightened between the connecting pipe, the washer, and the sealing tapered surface of the first pipe to achieve a sealing effect. In addition, since the washer is pressed against the connecting pipe, a space between the sealing tapered surface, the washer and the first pipe will no longer change, so that the sealing sleeve is pressed to an utmost extent. Even if the rotary sleeve rotates further, the sealing sleeve will not be pressed further, so that the sealing sleeve is subjected to a predetermined and an appropriate pressing force to ensure the sealing efficiency. At the same time, when the washer is pressed against the end surface of the connecting pipe, it is difficult for the locking sleeve to continue to move axially. Continue to rotate the rotary sleeve is capable of making the locking sleeve tightly grasp the first pipe under effects of abutting and pushing of the rotary sleeve and limiting of the washer, and the locking sleeve is axially positioned with the rotary sleeve; that is, the rotary sleeve can be thread-tightened until the locking sleeve reaches a predetermined and an appropriate locking force to ensure connection stability. Therefore, both effects of compression-tightening and sealing of the sealing sleeve, and tight locking and fixation of the locking sleeve in this application are gradually formed by rotation of the rotary sleeve, and the two effects do not interfere with each other as the process progresses, so that the two effects can achieve appropriate strength respectively, simultaneously addressing the tightness and connection stability.

In one embodiment of the above-mentioned greenhouse, when the end surface of the connecting pipe is abutted and pressed against the end surface of the washer, the sealing sleeve is compression-tightened between the sealing tapered surface of the connecting pipe, the end surface of the washer, and an outer peripheral surface of the first pipe. When the connecting pipe is pressed against the washer, a space formed between the sealing tapered surface of the connecting pipe, the end surface of the washer and the outer peripheral surface of the first pipe will not change, the sealing sleeve is compression-tightened in the space, even if during a process of the rotary sleeve further rotating and pressing against the locking sleeve, the sealing sleeve will not be affected, and thus to ensure the sealing efficiency.

In one embodiment of the above-mentioned greenhouse, a width of the end surface of the connecting pipe is smaller than a width of the end surface of the washer, when the end surface of the connecting pipe is pressed against an outer edge of the end surface of the washer, a sealing recess is formed between the sealing tapered surface and the end surface of the washer, and the sealing sleeve is compression-tightened in the sealing recess. The sealing recess provides space for the sealing sleeve, so that the sealing sleeve can be partially embedded into the sealing recess when the sealing sleeve is pressed tightly, and the sealing efficiency of the sealing sleeve can be further enhanced when the sealing sleeve is embedded into the sealing recess.

In one embodiment of the above-mentioned greenhouse, an outer diameter of the first pipe is smaller than an inner diameter of the connecting pipe, an outer peripheral surface of one end of the sealing sleeve facing the connecting pipe has a pressing tapered surface circumferentially, when the rotary sleeve is thread-tightened, the sealing tapered surface is capable of pressing against a larger end of the pressing tapered surface, so that an end surface of the sealing sleeve is pressed against the end surface of the washer, and a smaller end of the pressing tapered surface is embedded between an inner peripheral surface of the connecting pipe and the outer peripheral surface of the first pipe. A gap is formed between the inner peripheral surface of the connecting pipe and the outer peripheral surface of the first pipe for embedding the sealing sleeve, so that a contact sealing area is formed between the sealing sleeve and the inner peripheral surface of the connecting pipe and the outer peripheral surface of the first pipe to enhance the sealing efficiency.

In one embodiment of the above-mentioned greenhouse, a first end of the rotary sleeve is sleeved on the connecting pipe, and an inner peripheral surface of a second end of the rotary sleeve has an inward protruding locking portion, the locking sleeve is located between the locking portion and the first pipe, when the locking sleeve is pressed against the washer, the locking sleeve is capable of contracting in a radial direction and grasping the first pipe tightly under an action of the locking portion. The first end of the rotary sleeve provides an effect of threaded connection, and the second end of the rotary sleeve provides an effect of pressing the locking sleeve tightly, and the rotary sleeve is positioned with the locking sleeve when the locking sleeve grasps the first pipe tightly to ensure connection stability.

In one embodiment of the above-mentioned greenhouse, an end surface of the locking portion facing the connecting pipe is a limiting surface, the washer is located between the end surface of the connecting pipe and the limiting surface, a width D1 of the end surface of the washer is greater than a width D2 of the limiting surface, when the rotary sleeve is thread-tightened, an end surface of the locking sleeve is pressed against the end surface of the washer and is near an inner edge of the washer. A gap is provided between the end surface of the washer and the limiting surface, so the washer is capable of pressing against the locking sleeve, and the washer is capable of causing the locking sleeve to gradually grasp the first pipe tightly when the washer does not abut against the limiting surface to achieve a suitable locking force. Of course, the structure can set the limiting surface as a predetermined abutment surface, that is, rotate the rotary sleeve until the washer abuts against the limiting surface. At this time, the locking sleeve just reaches a suitable locking force, at least, a disposition of the limiting surface prevents the washer from pressing the locking sleeve excessively to cause damage to the locking sleeve.

In one embodiment of the above-mentioned greenhouse, an inner peripheral surface of the locking portion and an outer peripheral surface of the locking sleeve are both tapered surfaces, an end of the inner peripheral surface of the locking portion with a larger diameter and an end of the outer peripheral surface of the locking sleeve with a larger diameter both face toward the connecting pipe, and a taper of the inner peripheral surface of the locking portion is greater than a taper of the outer peripheral surface of the locking sleeve. The larger taper of the inner peripheral surface of the locking portion is capable of acting on the outer peripheral surface of the locking sleeve more efficiently, and the locking portion and the locking sleeve are axially positioned, so that the locking sleeve has better stability after being pressed tightly.

In one embodiment of the above-mentioned greenhouse, the locking sleeve is a plastic sleeve, the locking sleeve has a slit penetrating through end surfaces at two ends along an axial direction, an inner peripheral surface of the locking sleeve is a straight cylindrical surface, and a plurality of ribbed grips in a ring shape are arranged sequentially along an axial direction on the inner peripheral surface of the locking sleeve. The locking sleeve made of plastic material can be deformed, of course, disposition of the slit makes the locking sleeve to deform radially more efficiently, so that the locking sleeve is capable of contracting radially and grasping the first pipe tightly under an action of the locking portion, and the ribbed grips being pressed radially can be compressed and pressed tightly on the outer peripheral surface of the first pipe to improve connection stability.

In one embodiment of the above-mentioned greenhouse, a plurality of sprinklers are fixedly connected on the spray pipe, each of the sprinklers includes a body with a first end fixedly connected on the spray pipe and a blocking plate, inside the body is provided with a spray cavity, the spray cavity communicates with an inner hole of the spray pipe, an end surface of a second end of the body is provided with a spray hole communicating with the spray cavity, an adjusting screw is vertically fixed on a side of the blocking plate, the adjusting screw extends into the spray hole and is screwed on the body, an outlet gap is formed between an outer peripheral surface of the adjusting screw and a hole wall of the spray hole, and a spray gap is formed between the side of the blocking plate and an outer end surface of the body. The spray pipe is connected to an external water source, water enters the spray cavity of the body through the spray pipe, and enters the spray gap through the outlet gap, and then sprays around from the spray gap. Wherein the outlet gap is vertically and downwardly disposed, the blocking plate blocks the water sprayed from the outlet gap and changes a direction of a water current, under a blocking effect of the blocking plate, the water current is sprayed around in the form of water mist. Wherein the blocking plate is connected inside the body by the adjusting screw, and the spray gap is formed by the side of the blocking plate and an end surface of the body, so a width of the spray gap can be adjusted by adjusting the adjusting screw, and by adjusting a water pressure of the water current flowing through the spray gap, the water pressure can be conveniently adjusted when the water current is sprayed.

In one embodiment of the above-mentioned greenhouse, the body comprises a spray seat and a nozzle that are both cylindrical, the spray seat is fixedly connected on the spray pipe by fasteners, an end surface of the spray seat is provided with a pipe-shaped pipe connecting portion communicating with the spray cavity, a connecting hole is provided on a side wall of the spray pipe, the pipe connecting portion is inserted into the connecting hole and communicates with the inner hole of the spray pipe, the spray hole is located at one end of the nozzle, another end of the nozzle is screwed into the spray seat, an inner wall of the nozzle has an elongated mounting plate along a radial direction, the mounting plate has a cylindrical flow limiter, the flow limiter and the spray hole are disposed coaxially, a flow limiting gap is formed between an outer edge of a lower end of the flow limiter and an edge of an inner end hole opening of the spray hole, and the adjusting screw passes through an inner hole of the flow limiter and is thread-connected with the flow limiter. The flow limiter provides connection effect for the adjusting screw, and at the same time, the flow limiting gap formed between the flow limiter and the edge of the hole opening of the spray hole is capable of limiting the water current, thereby increasing a pressure when the water current passes.

Compared with the prior art, one embodiment of the greenhouse has the following advantages:

1. Since the sealing sleeve is not pressed during an assembly initially, it is easier for the first pipe to be inserted and to pass through the sealing sleeve, and a length of the first pipe being inserted can be adjusted as needed to adjust a length of the entire spray pipe.

2. Since the connecting pipe is pressed against the washer, a space between the sealing tapered surface, the washer and the first pipe will no longer change, so that the sealing sleeve is pressed to an utmost extent. Even if the rotary sleeve rotates further, the sealing sleeve will not be pressed further, so that the sealing sleeve is subjected to a predetermined and an appropriate pressing force to ensure the sealing efficiency.

3. As the rotary sleeve is further thread-tightened, the locking sleeve is gradually pressed against a second side of the washer, that is, the connecting pipe and the locking sleeve are respectively abutting and pressing against the two sides of the washer, making it difficult for the locking sleeve to continue to move axially. Therefore, under effects of abutting and pushing of the rotary sleeve and limiting of the washer, the locking sleeve is capable of grasping the first pipe tightly, and at the same time, the locking sleeve is axially positioned with the rotary sleeve; that is, the rotary sleeve can be thread-tightened until the locking sleeve reaches a predetermined and an appropriate locking force to ensure connection stability; that is, both effects of compression-tightening and sealing of the sealing sleeve, and tight locking and fixation of the locking sleeve are gradually formed by rotation of the rotary sleeve, and the two effects do not interfere with each other as the process progresses, so that the two effects can achieve appropriate strength respectively, simultaneously addressing the tightness and connection stability.

DETAILED DESCRIPTION OF THE INVENTION

The technical solutions of the invention are further described below with reference to the specific embodiments of the invention in conjunction with the accompanied drawings, but the invention is not limited to the embodiments.

Figure 1:
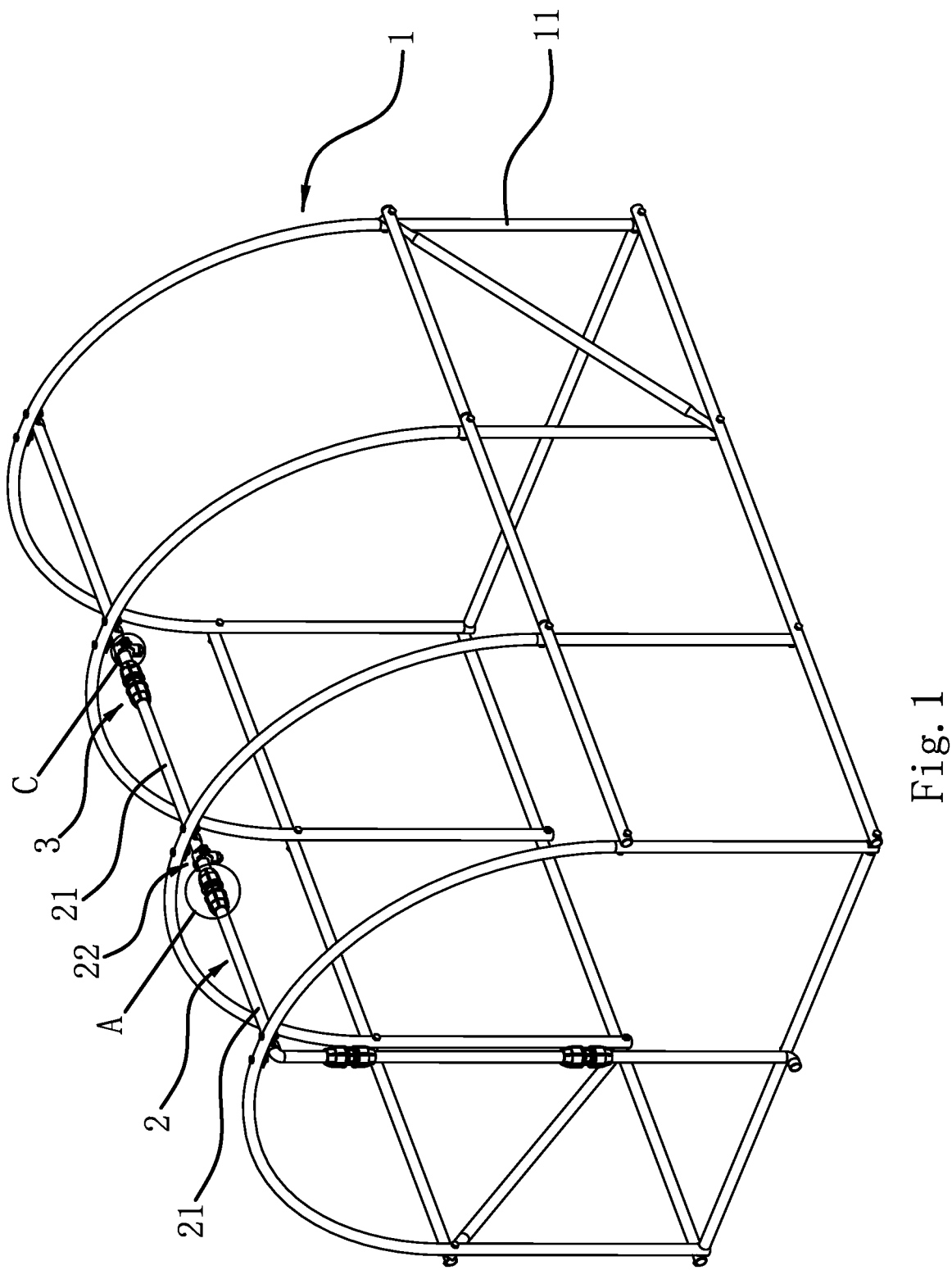
FIG. 1 is a perspective view of one embodiment of a greenhouse.
Figure 2:
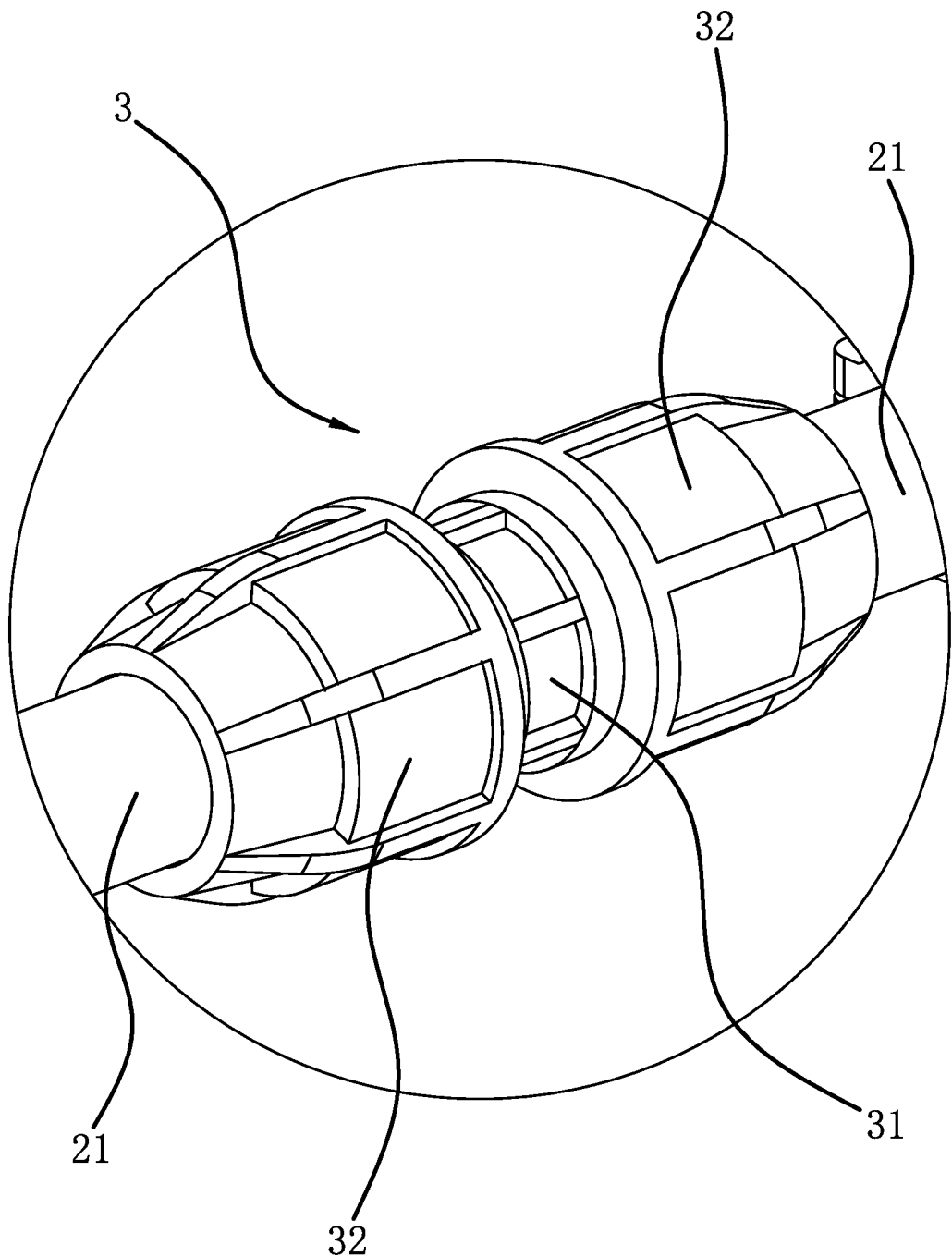
FIG. 2 is an enlarged view of Section A in FIG. 1.
Figure 3:
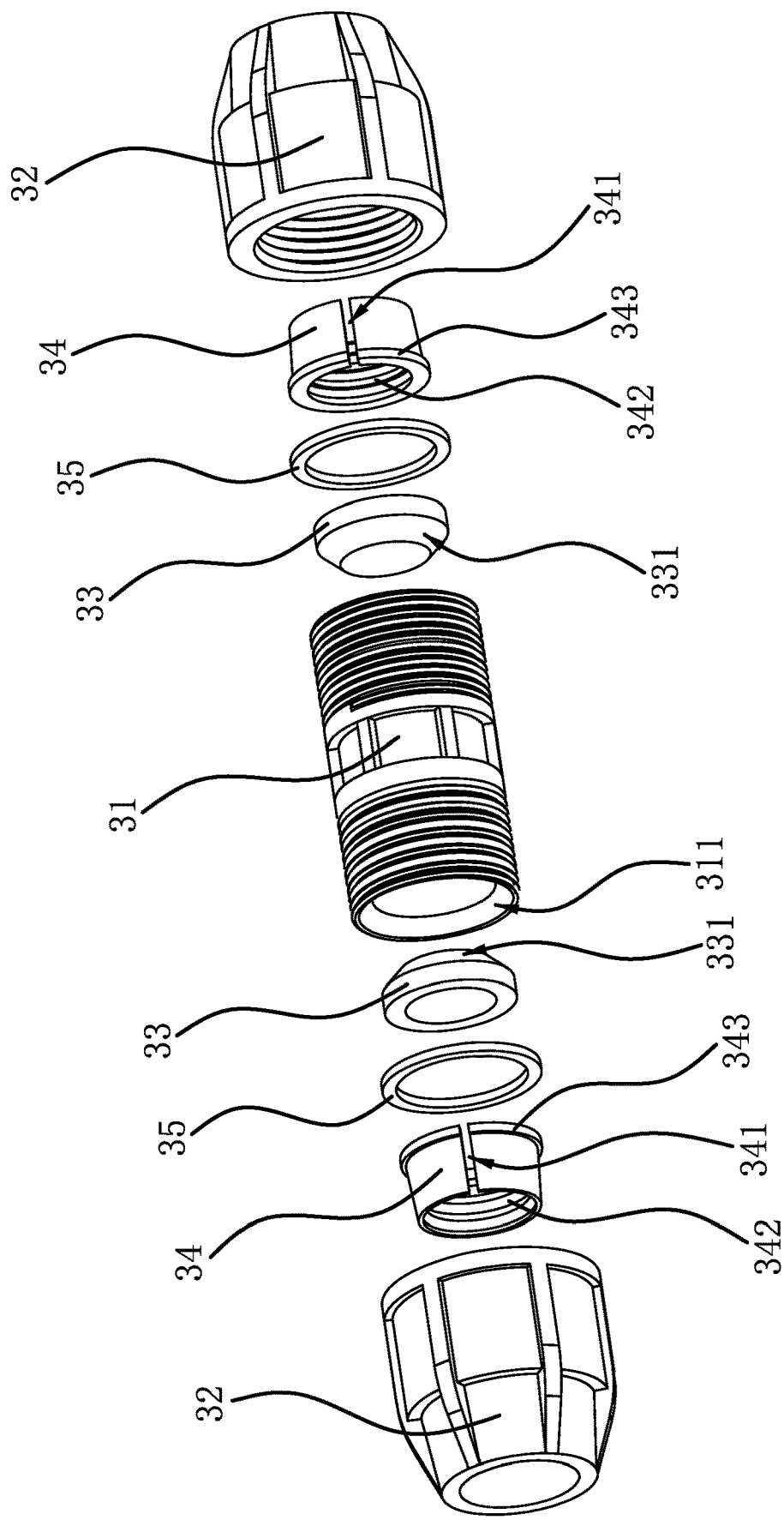
FIG. 3 is an exploded view of one embodiment of a pipe joint.
Figure 4:
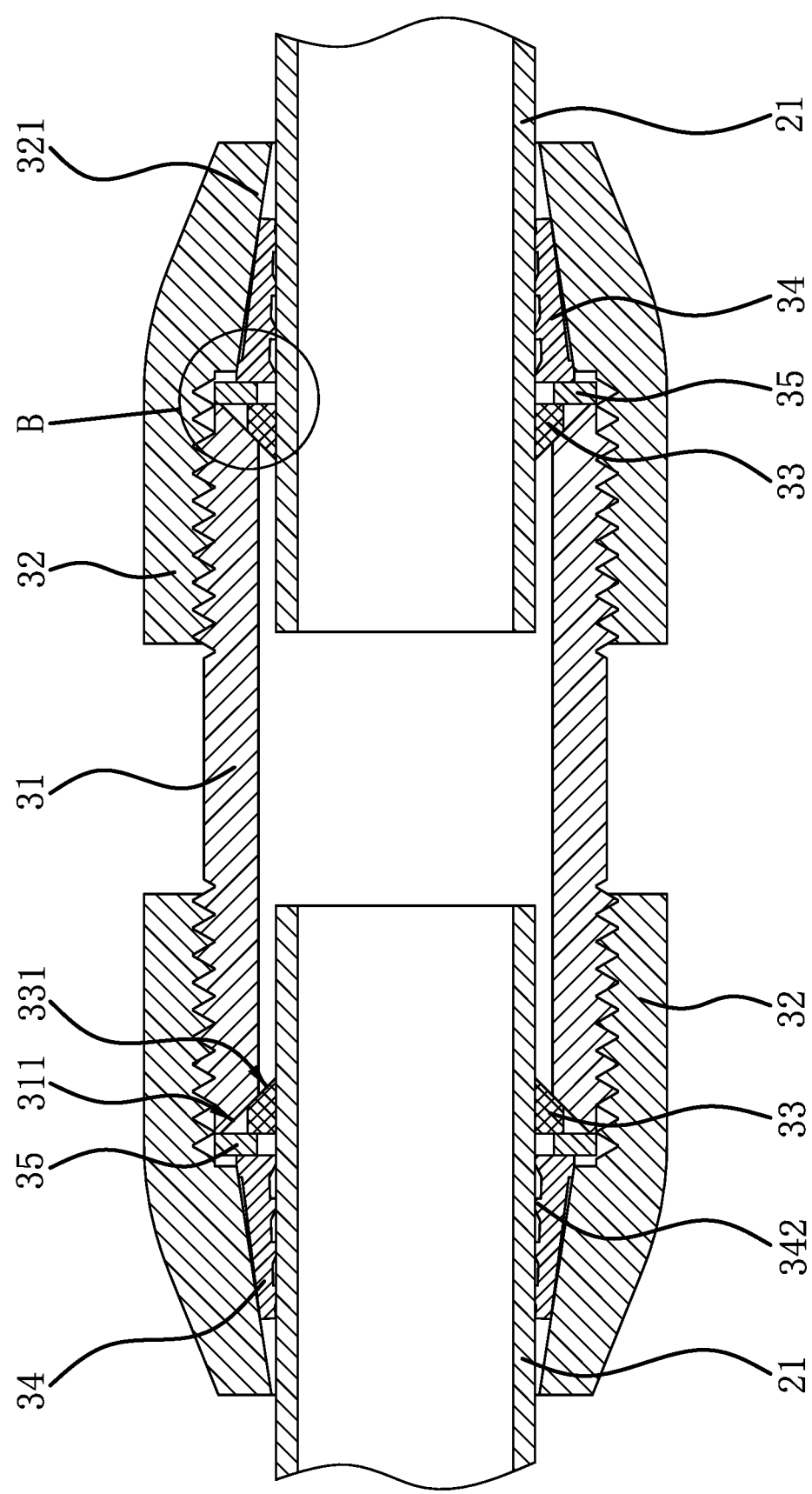
FIG. 4 is a partial sectional view of a structure of one embodiment of the pipe joint.

As shown in FIG. 1, one embodiment of a greenhouse comprises a support frame 1, the support frame 1 is formed by connecting a plurality of rods 11, a spray pipe 2 is fixed on a side and a top of the support frame 1, a lower end of the spray pipe 2 located on the side of the support frame 1 is used to connect with a water source, and an upper end of the spray pipe 2 located on the side of the support frame 1 is connected to the spray pipe 2 disposed horizontally at the top of the support frame 1. As shown in FIG. 2, the spray pipe 2 includes a plurality of pipes 21 and pipe joints 3 disposed between ends of two adjacent pipes 21, and a sprinkler 22 is fixed on a first pipe 21 for spraying water downward. As shown in FIGS. 3 and 4, the pipe joint 3 includes a connecting pipe 31 and two rotary sleeves 32, first ends of the two rotary sleeves 32 are respectively screwed to and sleeved on two ends of the connecting pipe 31, and inner peripheral surfaces of second ends of the rotary sleeves 32 have an inward protruding locking portion 321 respectively, and the ends of the two adjacent pipes 21 respectively pass through the locking portions 321 of the two rotary sleeves 32 and are inserted into the two ends of the connecting pipe 31. Ends of the first pipe 21 are respectively sleeved with a washer 35 and a locking sleeve 34, the washer 35 is made of rigid material, preferably made of plastic material. The washer 35 is located between the end of the connecting pipe 31 and the locking sleeve 34, and the locking sleeve 34 is located on an inner side of the locking portion 321. When the rotary sleeve 32 is thread-tightened, the connecting pipe 31 and the locking sleeve 34 are capable of respectively abutting and pressing against two sides of the washer 35; under the abutting and pushing of the rotary sleeve 32 and under the limiting of the washer 35, the locking sleeve 34 is capable of grasping the first pipe 21 tightly and forming an axial positioning with the rotary sleeve 32. A sealing sleeve 33 is further sleeved on the first pipe 21, the sealing sleeve 33 is located between the connecting pipe 31 and the washer 35, and an inner edge of an end surface of the connecting pipe 31 has a sealing tapered surface 311 along a circumferential direction. When the connecting pipe 31 is abutted and pressed against the washer 35, the sealing tapered surface 311 is capable of acting on the sealing sleeve 33, so that the sealing sleeve 33 is compression-tightened between the connecting pipe 31, the washer 35, and the first pipe 21.

Figure 5:
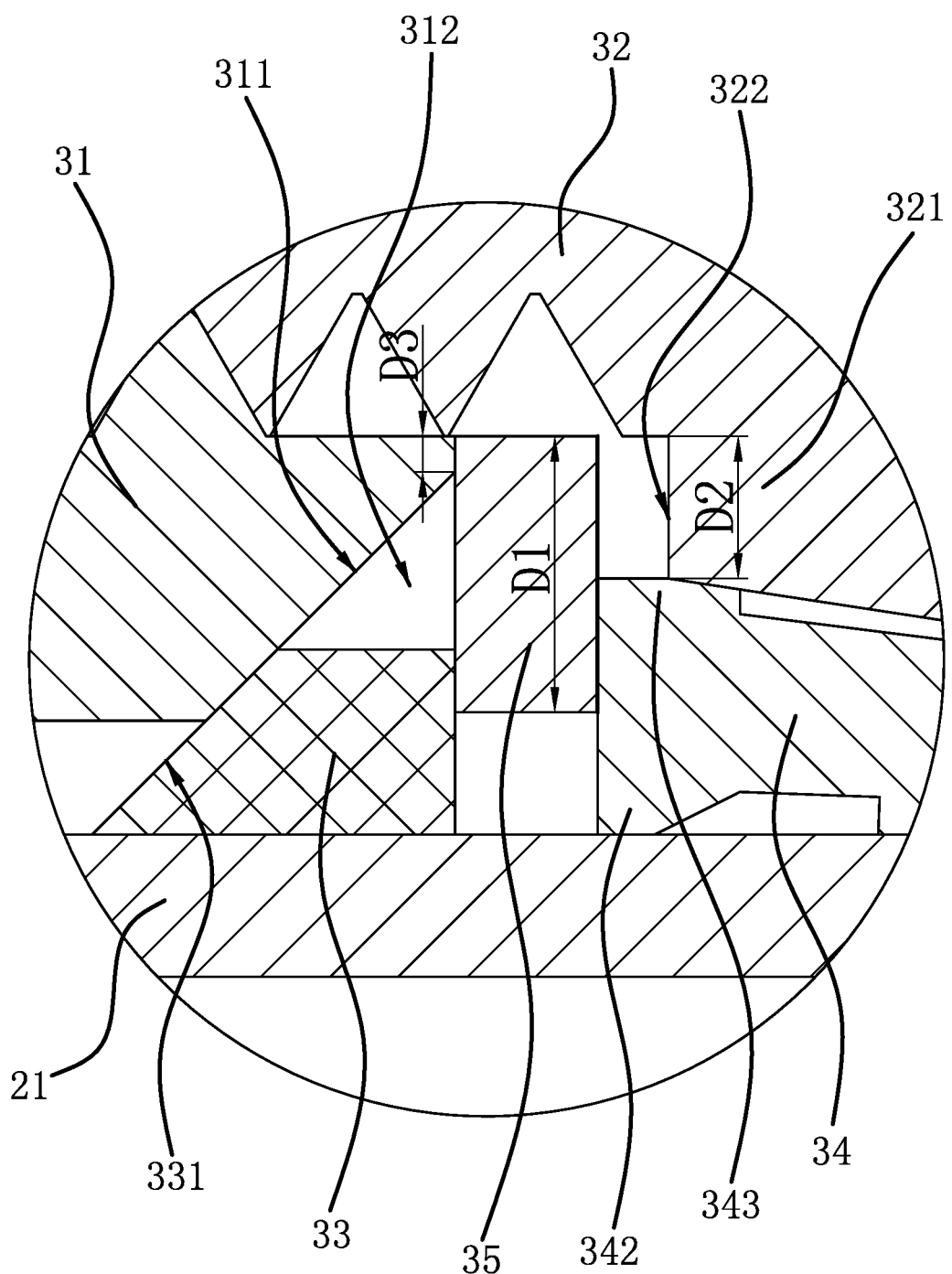
FIG. 5 is an enlarged view of Section B in FIG. 4.

Specifically, as shown in FIG. 5, a width D3 of the end surface of one embodiment of the connecting pipe 31 is smaller than a width D1 of the end surface of the washer 35, when the end surface of the connecting pipe 31 is pressed against an outer edge of the end surface of the washer 35, a sealing recess 312 is formed between the sealing tapered surface 311 and the end surface of the washer 35, and a width of the sealing recess 312 gradually decreases radially outward. An outer diameter of the first pipe 21 is smaller than an inner diameter of the connecting pipe 31, an outer peripheral surface of one end of the sealing sleeve 33 facing the connecting pipe 31 has a pressing tapered surface 331 circumferentially, when the rotary sleeve 32 is threadtightened, and the end surface of the connecting pipe 31 is pressed against the end surface of the washer 35, the sealing tapered surface 311 is capable of pressing against a larger end of the pressing tapered surface 331, so that an end surface of the sealing sleeve 33 is pressed against the end surface of the washer 35. The sealing sleeve 33 has a cylindrical outer peripheral surface being embedded into the sealing recess 312, and a smaller end of the pressing tapered surface 331 is embedded between an inner peripheral surface of the connecting pipe 31 and an outer peripheral surface of the first pipe 21; that is, the sealing sleeve 33 is compression-tightened between the sealing tapered surface 311 of the connecting pipe 31, the end surface of the washer 35, and the outer peripheral surface of the first pipe 21. An end surface of the locking portion 321 facing the connecting pipe 31 is a limiting surface 322, the washer 35 is located between the end surface of the connecting pipe 31 and the limiting surface 322, a width D1 of the end surface of the washer 35 is greater than a width D2 of the limiting surface 322, when the rotary sleeve 32 is thread-tightened, an end surface of the locking sleeve 34 is pressed against the end surface of the washer 35 and is near an inner edge of the washer 35. The locking sleeve 34 is a plastic sleeve, an end of the locking sleeve 34 facing the washer 35 has an abutting rim 343 circumferentially to increase a width of the end surface of the locking sleeve 34 for abutting against the washer 35 to ensure that the locking sleeve 34 is still capable of abutting against the washer 35 stably after the locking sleeve 34 contracts radially. The locking sleeve 34 has a slit 341 penetrating through end surfaces at two ends along an axial direction, an inner peripheral surface of the locking portion 321 and an outer peripheral surface of the locking sleeve 34 are both tapered surfaces, an end of the inner peripheral surface of the locking portion 321 with a larger diameter and an end of the outer peripheral surface of the locking sleeve 34 with a larger diameter both face toward the connecting pipe 31, and a taper of the inner peripheral surface of the locking portion 321 is greater than a taper of the outer peripheral surface of the locking sleeve 34. An inner peripheral surface of the locking sleeve 34 is a straight cylindrical surface before the locking sleeve 34 is pressed and deformed, and a plurality of ribbed grips 342 in a ring shape are arranged sequentially along an axial direction on the inner peripheral surface of the locking sleeve 34.

Figure 6:
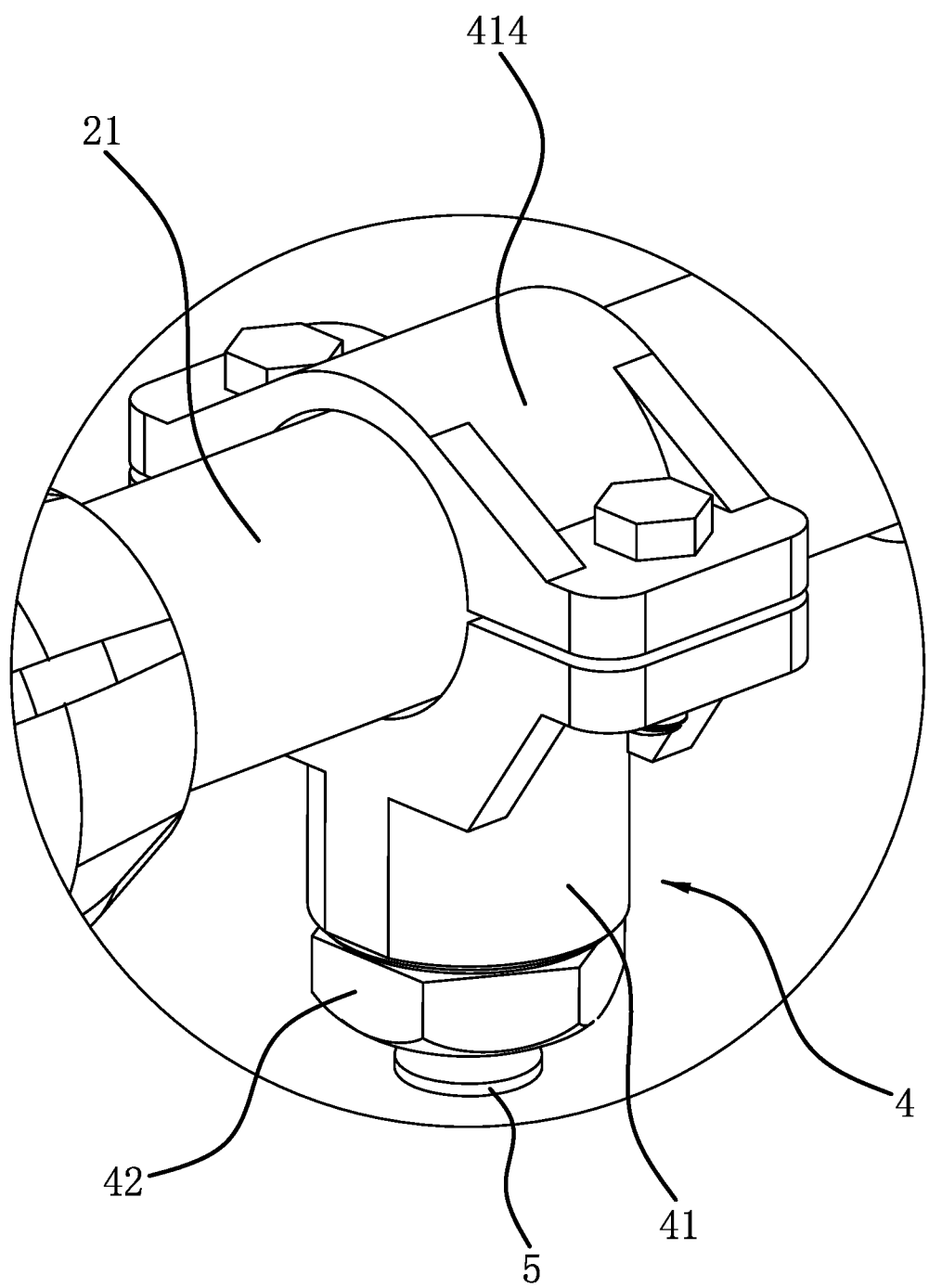
FIG. 6 is an enlarged view of Section C in FIG. 1.
Figure 7:
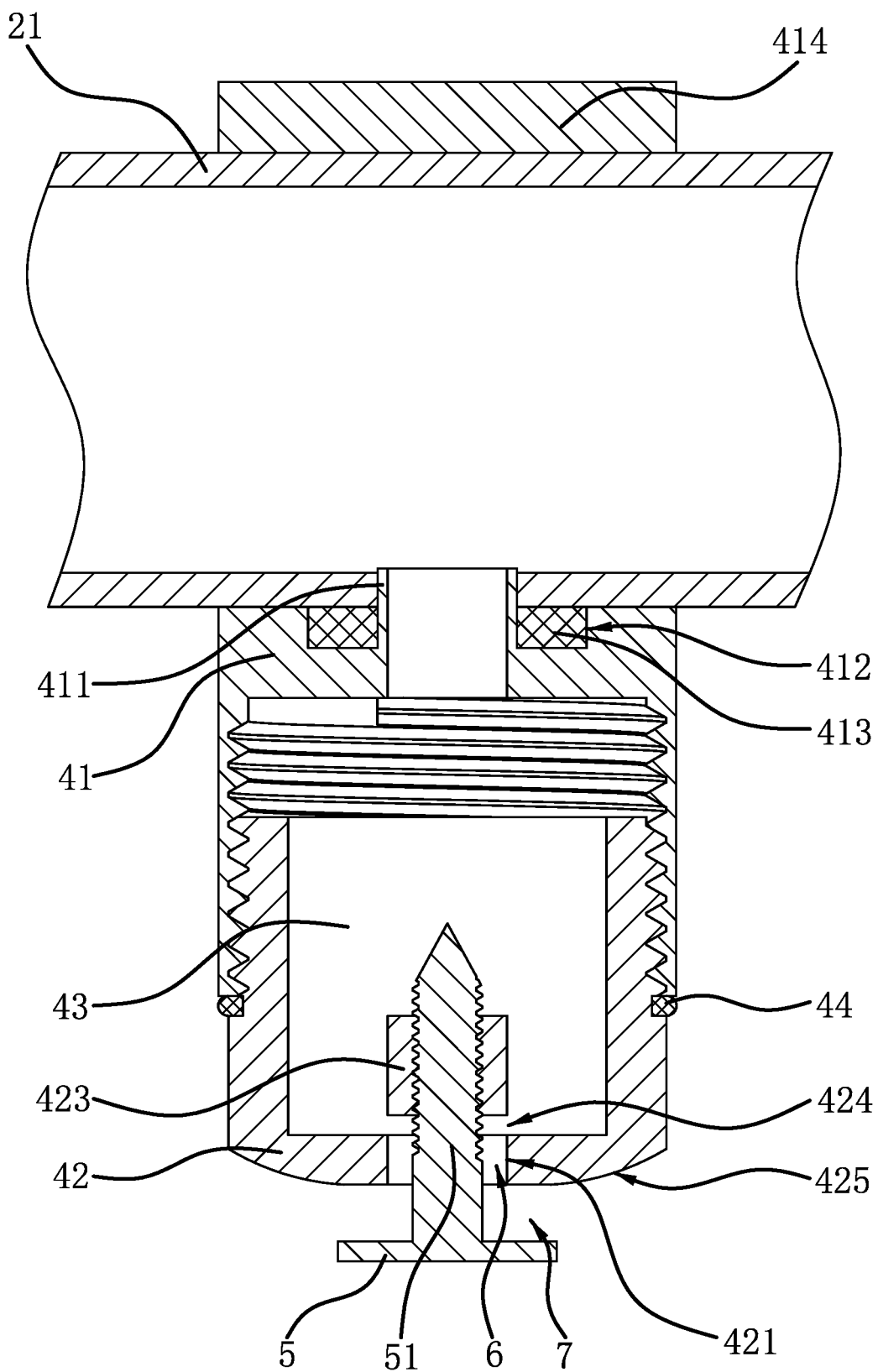
FIG. 7 is a transverse partial sectional view of a structure of one embodiment of a sprinkler.
Figure 8:
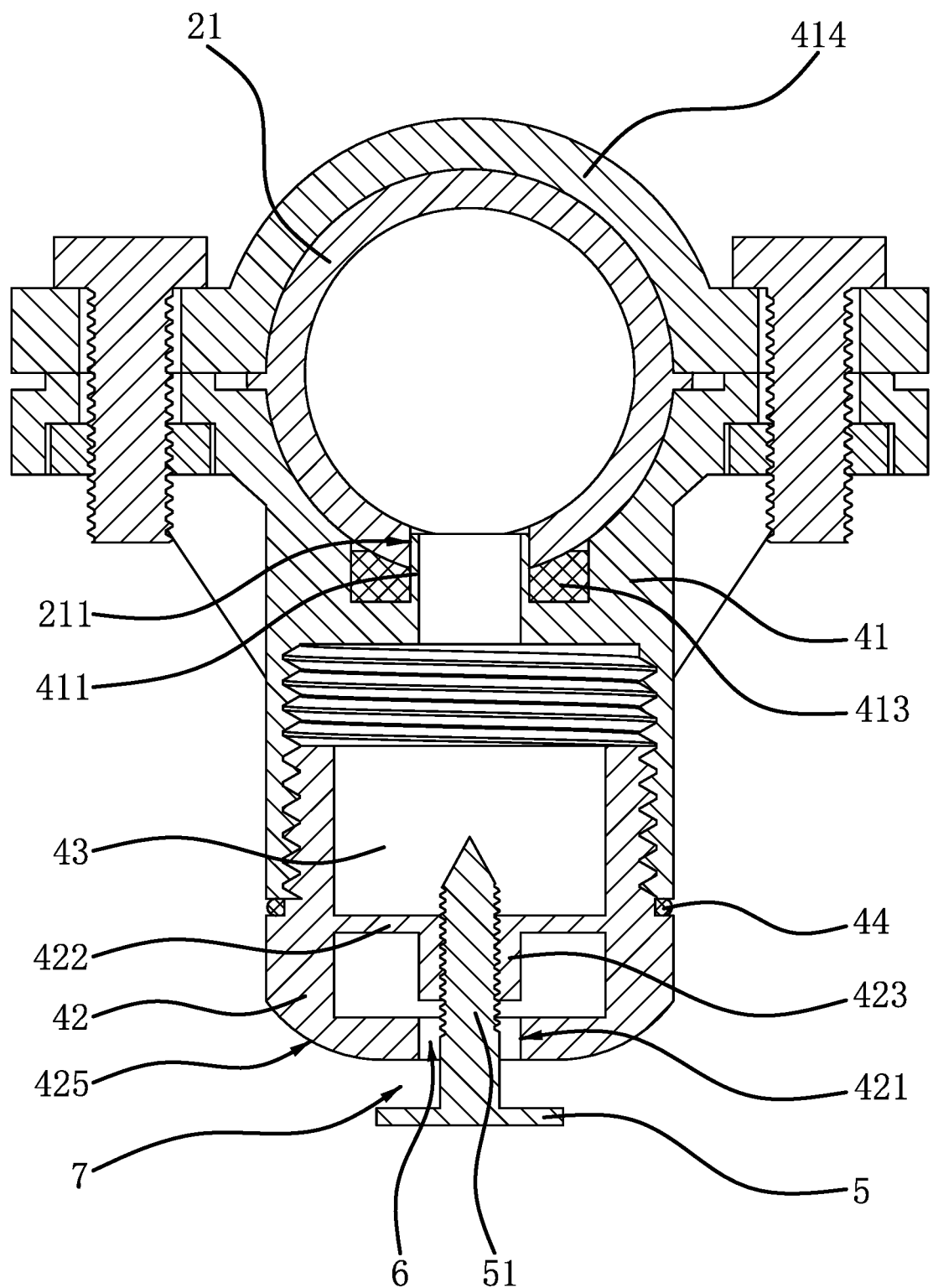
FIG. 8 is a longitudinal partial sectional view of a structure of one embodiment of the sprinkler.

As shown in FIG. 6, FIG. 7, and FIG. 8, one embodiment of the sprinkler 22 includes a body 4 and a blocking plate 5. The body 4 comprises a spray seat 41 and a nozzle 42 that are both cylindrical. An upper end of the spray seat 41 is fixed on the first pipe 21, an upper end of the nozzle 42 is inserted into the spray seat 41 from bottom upward, the nozzle 42 is thread-connected with the spray seat 41, a sealing ring 44 is further sleeved between the spray seat 41 and the nozzle 42, and a spray cavity 43 is formed between the nozzle 42 and the spray seat 41. The spray cavity 43 communicates with an inner hole of the first pipe 21, and a spray hole 421 is disposed at a lower end surface of the nozzle 42. An adjusting screw 51 is vertically fixed on a side of the blocking plate 5, the adjusting screw 51 extends into the spray hole 421 and is screwed on the body 4, an outlet gap 6 is formed between an outer peripheral surface of the adjusting screw 51 and a hole wall of the spray hole 421, and a spray gap 7 is formed between the side of the blocking plate 5 and an outer end surface of the body 4. Specifically, an inner wall of the nozzle 42 has an elongated mounting plate 422 along a radial direction, the mounting plate 422 has a cylindrical flow limiter 423, and the flow limiter 423 and the spray hole 421 are disposed coaxially. A flow limiting gap 424 is formed between an outer edge of a lower end of the flow limiter 423 and an edge of an inner end hole opening of the spray hole 421, and the adjusting screw 51 passes through the spray hole 421 along a center line direction of the spray hole 421 and is thread-connected into an inner hole of the flow limiter 423. The outlet gap 6 is evenly disposed around the adjusting screw 51 in a circumferential direction. An outer diameter of the blocking plate 5 is smaller than an outer diameter of the nozzle 42, and the outer diameter of the blocking plate 5 is greater than an inner diameter of the spray hole 421. An edge of an end surface of the nozzle 42 has an arcuate guide surface 425 along a circumferential direction. The guide surface 425 and the end surface of the nozzle 42 have a smooth transition. The spray seat 41 is fixedly connected on the first pipe 21 by fasteners, an end surface of the spray seat 41 is provided with a pipe-shaped pipe connecting portion 411 communicating with the spray cavity 43, a connecting hole 211 is provided on a side wall of the first pipe 21, the pipe connecting portion 411 is inserted into the connecting hole 211 and communicates with an inner cavity of the first pipe 21. The end surface of the spray seat 41 is provided with a sealing groove 412 surrounding the pipe connecting portion 411 in a circumferential direction, a sealing pad 413 is sleeved inside the sealing groove 412, and the sealing pad 413 is pressed tightly against the outer peripheral surface of the first pipe 21. The fastener is a hoop 414 fixedly sleeved on the first pipe 21, and the spray seat 41 and one of hoop plates of the hoop 414 are integrally formed.

The specific embodiments described herein are merely illustrative of the scope of the invention. Technicians skilled in the art to which the invention pertains can make various modifications or additions to the specific embodiments described or replace them in a similar manner, without departing from the scope of the invention or beyond the scope defined by the appended claims.

Although the technical terms support frame 1, rod 11, spray pipe 2, and the like are used more frequently herein, the possibility of using other technical terms is not excluded. These technical terms are merely used to describe and explain the nature of the invention more conveniently; construing them as any additional limitation is contrary to the scope of the invention.

LIST OF REFERENCED PARTS

1 support frame
11 rod
2 spray pipe
21 pipe
211 connecting hole
22 sprinkler
3 pipe joint
31 connecting pipe
311 sealing tapered surface
312 sealing recess
32 rotary sleeve
321 locking portion
322 limiting surface
33 sealing sleeve
331 pressing tapered surface
34 locking sleeve
341 slit
342 ribbed grip
343 abutting rim
35 washer
4 body
41 spray seat
411 pipe connecting portion
412 sealing groove
413 sealing pad
414 hoop
42 nozzle
421 spray hole
422 mounting plate
423 flow limiter
424 flow limiting gap
425 guide surface
43 spray cavity
44 sealing ring
5 blocking plate
51 adjusting screw
6 outlet gap
7 spray gap

What is claimed is:

1. A greenhouse comprising:

a support frame; and a spray pipe fixed on the support frame, the spray pipe comprising a plurality of pipes and a pipe joint disposed between ends of two adjacent pipes, and the pipe joint comprising a connecting pipe and two rotary sleeves respectively screwed to and sleeved on two ends of the connecting pipe;

wherein the two adjacent pipes are respectively inserted into the two ends of the connecting pipe, each of the ends of the two adjacent pipes is sleeved with a sealing sleeve and a locking sleeve, and the sealing sleeve and the locking sleeve are located in a corresponding rotary sleeve of the two rotary sleeves;

wherein each of the ends of the two adjacent pipes is further sleeved with a washer made of rigid material, each of the washers is located between the connecting pipe and the locking sleeve correspondingly, an inner edge of each of end surfaces of the connecting pipe has a sealing tapered surface, each of the sealing sleeves is located between the connecting pipe and the washer correspondingly;

wherein when the two rotary sleeves are thread-tightened, the connecting pipe and each of the locking sleeves are capable of respectively abutting and pressing against two sides of each of the washers correspondingly;

wherein when the connecting pipe is abutted and pressed against each of the washers, each of the sealing tapered surfaces is capable of acting on the sealing sleeve correspondingly, so that each of the sealing sleeves is compression-tightened between the connecting pipe, the washer, and the first adjacent pipe correspondingly;

wherein under the abutting and pushing of the corresponding rotary sleeve of the two rotary sleeves and under the limiting of the washer, each of the locking sleeves is capable of grasping the adjacent pipe tightly and forming an axial positioning with the corresponding rotary sleeve of the two rotary sleeves;

wherein a first end of each of the two rotary sleeves is sleeved on the connecting pipe, and an inner peripheral surface of a second end of each of the two rotary sleeves has an inward protruding locking portion, each of the locking sleeves is located between the inward protruding locking portion and the adjacent pipe correspondingly, when each of the locking sleeves is pressed against the washer, each of the locking sleeves is capable of contracting in a radial direction and grasping the adjacent pipe tightly under an action of the inward protruding locking portion correspondingly;

wherein an inner peripheral surface of each of the inward protruding locking portions and an outer peripheral surface of each of the locking sleeves are both tapered surfaces, an end of the inner peripheral surface of each of the inward protruding locking portions with a larger diameter and an end of the outer peripheral surface of each of the locking sleeves with a larger diameter both face toward the connecting pipe, and a taper of the inner peripheral surface of each of the inward protruding locking portions is greater than a taper of the outer peripheral surface of each of the locking sleeves correspondingly; and wherein an end of each of the locking sleeves facing the washer has an outward protruding abutting rim circumferentially, and the inner peripheral surface of each of the inward protruding locking portions has abutted with the outward protruding abutting rim correspondingly.

2. The greenhouse as claimed in claim 1, wherein when each of the end surfaces of the connecting pipe is abutted and pressed against an end surface of the washer correspondingly, each of the sealing sleeves is compression-tightened between the sealing tapered surface of the connecting pipe, the end surface of the washer, and an outer peripheral surface of the adjacent pipe correspondingly.

3. The greenhouse as claimed in claim 2, wherein a width D3 of each of the end surfaces of the connecting pipe is smaller than a width D1 of the end surface of the washer correspondingly, when each of the end surfaces of the connecting pipe is pressed against an outer edge of the end surface of the washer correspondingly, a sealing recess is formed between the sealing tapered surface and the end surface of the washer correspondingly, and each of the sealing sleeves is compression-tightened in the sealing recess correspondingly.

4. The greenhouse as claimed in claim 3, wherein an outer diameter of each of the two adjacent pipes is smaller than an inner diameter of the connecting pipe, an outer peripheral surface of one end of each of the sealing sleeves facing the connecting pipe has a pressing tapered surface circumferentially, when the two rotary sleeves are thread-tightened, each of the sealing tapered surfaces is capable of pressing against a larger end of the pressing tapered surface correspondingly, so that an end surface of each of the sealing sleeves is pressed against the end surface of the washer correspondingly, and a smaller end of each of the pressing tapered surfaces is embedded between an inner peripheral surface of the connecting pipe and the outer peripheral surface of the adjacent pipe correspondingly.

5. The greenhouse as claimed in claim 1, wherein an end surface of each of the inward protruding locking portions facing the connecting pipe is a limiting surface, each of the washers is located between the end surface of the connecting pipe and the limiting surface correspondingly, a width al of the end surface of each of the washers is greater than a width D2 of the limiting surface correspondingly, when the two rotary sleeves are thread-tightened, an end surface of each of the locking sleeves is pressed against the end surface of the washer and is near an inner edge of the washer correspondingly.

6. The greenhouse as claimed in claim 1, wherein each of the locking sleeves is a plastic sleeve, each of the locking sleeves has a slit penetrating through end surfaces at two ends along an axial direction, an inner peripheral surface of each of the locking sleeve is a straight cylindrical surface, and a plurality of ribbed grips in a ring shape are arranged sequentially along an axial direction on the inner peripheral surface of each of the locking sleeves.

7. The greenhouse as claimed in claim 1, wherein a plurality of sprinklers are fixedly connected on the spray pipe, each of the sprinklers includes a body with a first end fixedly connected on the spray pipe and a blocking plate, inside the body is provided with a spray cavity, the spray cavity communicates with an inner hole of the spray pipe, an end surface of a second end of the body is provided with a spray hole communicating with the spray cavity, an adjusting screw is vertically fixed on a side of the blocking plate, the adjusting screw extends into the spray hole and is screwed on the body, an outlet gap is formed between an outer peripheral surface of the adjusting screw and a hole wall of the spray hole, and a spray gap is formed between the side of the blocking plate and an outer end surface of the body.

8. The greenhouse as claimed in claim 7, wherein the body comprises a spray seat and a nozzle that are both cylindrical, the spray seat is fixedly connected on the spray pipe by fasteners, an end surface of the spray seat is provided with a pipe-shaped pipe connecting portion communicating with the spray cavity, a connecting hole is provided on a side wall of the spray pipe, the pipe connecting portion is inserted into the connecting hole and communicates with the inner hole of the spray pipe, the spray hole is located at one end of the nozzle, another end of the nozzle is screwed into the spray seat, an inner wall of the nozzle has an elongated mounting plate along a radial direction, the mounting plate has a cylindrical flow limiter, the flow limiter and the spray hole are disposed coaxially, a flow limiting gap is formed between an outer edge of a lower end of the flow limiter and an edge of an inner end hole opening of the spray hole, and the adjusting screw passes through an inner hole of the flow limiter and is thread-connected with the flow limiter.

\* \* \* \* \*